(12) United States Patent
Issal

(10) Patent No.: US 7,030,756 B2
(45) Date of Patent: Apr. 18, 2006

(54) SURFACE COVERING UNIT

(75) Inventor: Raimo Issal, Malmo (SE)

(73) Assignee: Pergo (Europe) AB, Trelleborg (SE)

( * ) Notice: Subject to any disclaimer, the term of this patent is extended or adjusted under 35 U.S.C. 154(b) by 0 days.

(21) Appl. No.: 10/494,208

(22) PCT Filed: Oct. 15, 2002

(86) PCT No.: PCT/SE02/01864

§ 371 (c)(1),
(2), (4) Date: May 21, 2004

(87) PCT Pub. No.: WO03/038777

PCT Pub. Date: May 8, 2003

(65) Prior Publication Data
US 2004/0263328 A1    Dec. 30, 2004

(30) Foreign Application Priority Data
Oct. 31, 2001  (SE) .................................. 0103611

(51) Int. Cl.
G08B 1/08 (2006.01)
(52) U.S. Cl. ............. 340/539.27; 340/540; 340/870.17
(58) Field of Classification Search .......... 340/870.16, 340/870.17, 539.1, 539.22, 539.26, 540, 340/539.27, 584, 665, 666, 825.72, 286.01, 340/286.02, 286.05, 539.14, 531; 455/561
See application file for complete search history.

(56) References Cited

U.S. PATENT DOCUMENTS

| 3,649,877 | A | * | 3/1972 | Friedman et al. | ........... 361/188 |
| 3,961,323 | A | * | 6/1976 | Hartkorn | ................. 340/539.1 |
| 4,550,311 | A | * | 10/1985 | Galloway et al. | ........... 340/531 |
| 4,924,214 | A | | 5/1990 | Hill | |
| 5,289,160 | A | * | 2/1994 | Fiorletta | ..................... 340/447 |
| 5,635,907 | A | * | 6/1997 | Bernard et al. | .......... 340/573.4 |
| 5,956,654 | A | | 9/1999 | Deville et al. | |
| 5,969,606 | A | * | 10/1999 | Reber et al. | ................ 340/540 |
| 6,486,800 | B1 | * | 11/2002 | Hattori | ....................... 340/984 |

FOREIGN PATENT DOCUMENTS

| EP | 0539275 | 4/1993 |
| EP | 0860803 | 8/1998 |
| WO | 9010920 | 9/1990 |
| WO | 0075417 | 12/2000 |

* cited by examiner

Primary Examiner—Brent A. Swarthout
(74) Attorney, Agent, or Firm—Stevens, Davis, Miller & Mosher, L.L.P.

(57) ABSTRACT

Surface covering unit comprising surface elements with supporting base, decorative upper surface and edges for joining said surface elements into said surface covering unit. The surface covering unit comprises at least one digital memory member connected to an antenna for radio frequency transmitted communication with a base station.

13 Claims, 1 Drawing Sheet

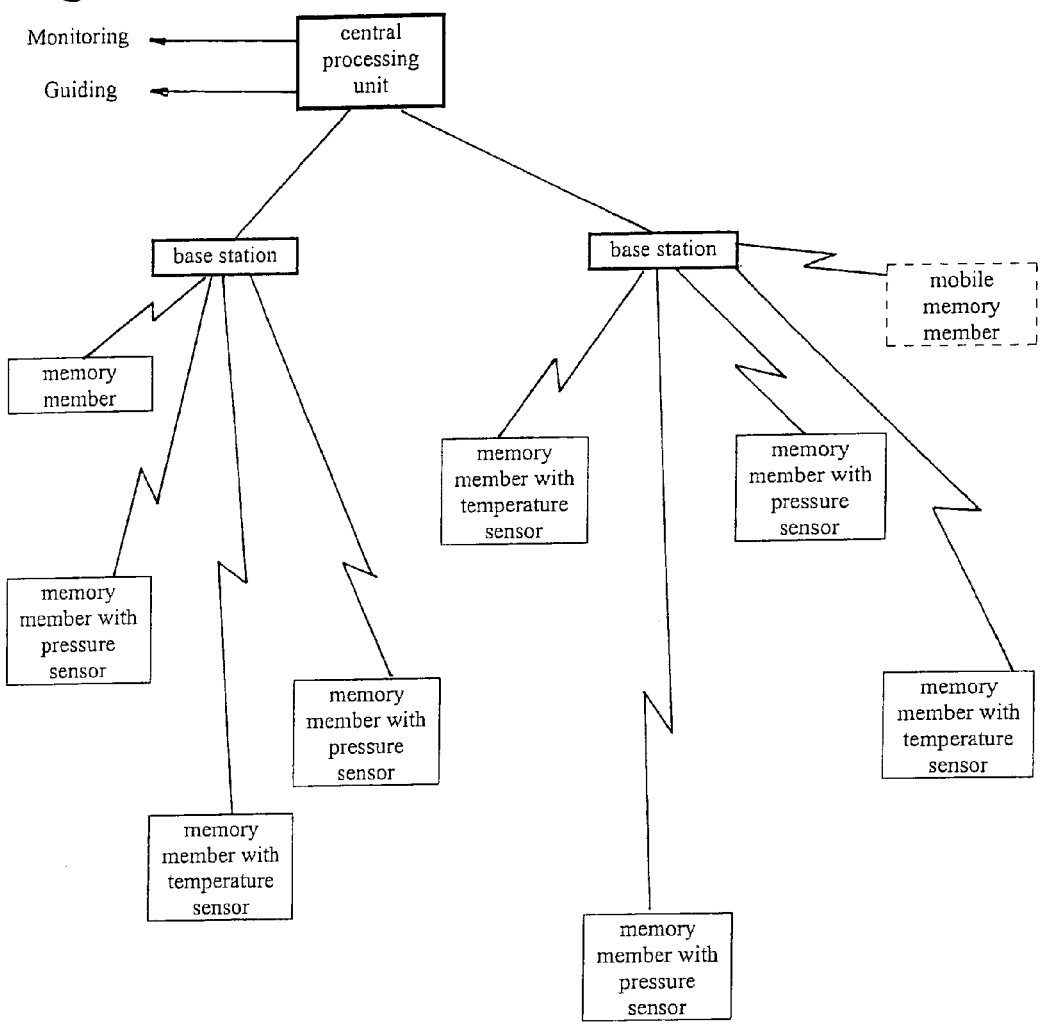

SURFACE COVERING UNIT

This application is a §371 Application of International Application No. PCT/SE02/01864, filed on Oct. 15, 2002, claiming the priority of Swedish Application No. 0103611-0, filed Oct. 31, 2001, the entire disclosure of which is incorporated herein by reference in its entirety.

The present invention relates to a surface covering unit provided with at least one digital memory member.

Different types of electronic ID cards are well known nowadays. The most common type is still the one containing a magnetic strip which requires a reader which is more or less in contact with the card itself. This means that the card owner will have to pick his card up and put it into the reader in order to achieve the purpose with the card. This is more or less awkward.

Another known type of ID card which is growing rapidly in use, is the card that contains a memory unit in the form of a microchip which can store much information. This type of cared can be read over some distance by means of radio frequency communication as it can be provided with an antenna which is integrated into the ID card together with the microchip. This has the advantage that the owner of the card will not have to pick it up and to put it into a specific reader. Energy to the radio communication sent by the card is provided by the reader as a carrier wave on which information from reader to card is interlaced. No battery will therefore have to be included in the ID card.

There is an increasing need to control and guide traffic as well as logistic foremost in public environment like airports, subway stations, railway stations and stores, but to some extent also in offices and households. As microprocessors are very cheap nowadays, it is also possible to achieve statistics and guiding, more or less automatically. There is also an increasing need for identification without utilising visible encoding.

The above mentioned problems have been solved through the present invention whereby a hidden and cost effective device for guiding, identification and control of selected items is achieved.

Accordingly, the invention relates to a surface covering unit comprising surface elements with supporting base, a decorative upper surface and edges for joining said surface elements into said surface covering unit. The invention is characterised in that the surface covering unit comprises at least one digital memory member connected to an antenna for radio frequency transmitted communication with a base station. The base station may be a static or a mobile unit.

The digital memory member is suitably encoded with digital information in connection to the installation of the surface covering unit. The information encoded into the digital memory member may suitably comprise information selected from the group consisting of; date of installation, surface element batch number, installer, environmental conditions during installation and accessories used for the installation. This information may be used for follow up of long term quality studies as well as identification in warranty cases.

According to one embodiment of the invention the digital memory member further comprises a processing unit. According to another embodiment of the invention the digital memory member further comprises a temperature sensor. According to yet another embodiment of the invention digital memory member further comprises a pressure sensor which suitably is of a piezo electric type. The base station is suitably installed on a distance within 100 m from one or more digital memory member. The base station communicates intermittently with the digital memory members via radio frequency. The base station preferably comprises a central processing unit. The central processing unit is used for collecting and processing the data collected from the digital memory members. The data collected and processed suitably comprises data like traffic for selected surface areas, temperature for selected surface areas and lapses in communication with selected digital memory members. The collected data is suitably used for guiding items selected from the group consisting of; goods display in stores, burglar alarm, refurnish planning, logistic planning, environmental control, message presentation and light emission.

The digital memory members may according to one embodiment of the invention further comprises mobile digital memory members also equipped with antennas. These mobile digital memory members are encoded with digital information. This information comprises selected information like date of installation, personal identification code, supervisor code, passage area limitations, passage date and time limitations. The mobile digital memory members are used for guiding items like burglar alarm, environmental control, message presentation, light emission and power supply to household utensils.

BRIEF DESCRIPTION OF THE DRAWING

The invention is described further together with an enclosed FIGURE. The FIGURE shows schematically a system comprising a static digital memory member, a number of digital memory members with temperature sensor and digital memory members comprising pressure sensor. The digital memory members are individually connected to each an antenna for radio frequency transmitted communication with a base station. The base station is a device which is used for transmitting power to the memory members via radio frequency so that the memory member may send its contained information or receive information to be encoded in the memory member, via radio frequency. The base station is also used for receiving the information sent by the memory member and in certain cases also for sending information to be encoded into the memory member. The base station may be a mobile unit or a static unit.

The digital memory member is suitably encoded with digital information in connection to the installation of the surface covering unit. The information encoded into the digital memory member comprises information regarding date of installation, surface element batch number, installer, environmental conditions during installation and accessories used for the installation. This information is used for follow up of long term quality studies as well as identification in warranty cases. It is suitable to utilise a mobile base station for both encoding and reading this information in the simplest way of exercising the present invention. The digital memory units comprising temperature and pressure sensors are equipped with a processing unit and communicates intermittently with a base station installed on a distance within 100 m from each one of the digital memory members. The base station communicates with the digital memory members via radio frequency. The base station comprises a central processing unit. The central processing unit is used for collecting and processing the data collected from the digital memory members. The data collected and processed suitably comprises traffic data for selected surface areas, temperature data for selected surface areas and lapses in communication with selected digital memory members. The collected data may be used for guiding several different operations like goods display in stores, burglar alarm, refurnish planning, logistic planning, environmental control, message presentation and light emission. A number of pressure sensors may for example be arranged on strategic areas on the floor of a store. The sensors are linked to a central processing unit via one or more base units. The central processing units collects the data and can display walking pattern of customers in the store as well as traffic density in selected areas. This information can be used for a better display of products which may benefit sales as well as the customers. The same sensors may also be used for environmental control increasing air ventilation and air conditioning to areas where people gather and during closed hours be used to trigger burglar alarms when nobody is expected to step on a pressure sensor.

The sensors may also be used for increasing light emission in offices and homes when a person enters a room or a corridor as well as turning the light off when nobody is present. The central processing unit may also be connected to the Internet so that the sensors can be monitored from any location. It will also be possible to make refurnish plans made on actual wear and to make the central processing unit call for example a cleaning company or a refurnish company when a selected amount of people has stepped on a specified sensor.

It is also possible to have the base station communicate with mobile digital memory members also equipped with antennas. These mobile digital memory members are also encoded with digital information. This information may for example comprise information like date of installation, personal identification code, supervisor code, passage area limitations, passage date and time limitations. The mobile digital memory members may be used for guiding items like burglar alarm, environmental control, message presentation, light emission and power supply to household utensils.

Both the static and mobile memory members may for example also be used in geriatric care for watching people suffering from conditions like Alzheimer's. Since the only thing registered is movement, the surveillance will have low impact on the personal integrity. The base station may be programmed for guiding selected electrical outlets and gas stoves assisting the caretaker by closing power supply to household utensils which otherwise could cause fire or other hazards when the caretakers leaves home. The sensors may also be used for activating selected functions when the caretaker enters a room within the watched area or to alarm the care centre if no movement has been registered for a predetermined period of time. Movement patters over elongated periods of time may also be recorded which may be used for evaluating development of both health and treatment.

It is even possible to apply a mobile memory member on the collar of the family pet whereby a pet door may be opened only if the desired pet is in front of it and receives rations when in front of the pet feeder. A pressure sensor will register the presence of a pet while the mobile digital memory member will identify the family pet and the pet door will open. The pet feeder will work in a similar manner.

Another example where both static and mobile memory members can be used is in parking lots where each parking space has a static sensor, while the car or the driver has a mobile memory member. This combination may be used for paying parking bills as well as guiding the driver back to his vehicle, which is a great advantage on very big parking lots.

It is, as can be understood from the above, a great flexibility in the system as the presence of a mobile memory member can be used for starting a number of events. These events can be pre-programmed to certain days or times and for certain memory members. This means that the presence of a first memory member may start one series of events when a first pressure sensor is activated and another event when a second pressure sensor is activated. It may also start one event when a first memory member is present and another event when a second memory member is present. The range of the base stations may of course be adjusted to the actual use. In some cases a larger range is desired while a shorter range is desired in other cases.

The static memory members may suitably be integrated with the surface elements and may for example be arranged in a special recess on the rear side of the surface element. Such a surface element may for example be a floor board, a wall panel or a ceiling panel. Pressure sensors are advantageously used on floor boards and wall panels while temperature sensors may be used on all embodiments of surface elements.

A surface element according to the present invention includes a core which is covered with an upper decorative surface. The core most often consists of wood particles or fibre bonded together with glue or resin. Since the core material is sensitive to moisture it may be advantageous to treat the area closest to the joint if the floor is to be exposed to moisture. This treatment may suitably include resin, wax or some kind of lacquer. It will not be necessary to treat the joint if the surface elements are to be glued since the glue itself will protect the joint from moisture penetration. The decorative upper surface may consist of a decorative paper impregnated with an acrylic or a melamine-formaldehyde resin. One or more layers of so called overlay paper of cellulose, impregnated with acrylic or melamine-formaldehyde resin is suitably placed on top of the decorative paper. One or more of the above layers may be sprinkled with hard particles, of for example aluminium oxide, silicon carbide or silicon oxide in connection to the impregnation in order to improve the abrasion resistance. The paper impregnated with resin is cured before, or in connection to applying it to the core. The paper layers are suitably laminated together before they are applied to the core in cases where the upper decorative surface is constituted by more than one paper layers. The lower side may suitably be coated with a lacquer or a resin impregnated paper.

The core of the surface elements may alternatively be constituted by a mixture of 4–6 parts by weight of particles such as wood fibre, with an average particle size in the range 50 μm–3000 μm which is agglomerated with 4–6 parts by weight of a thermoplastic polymer. The particles may partly or completely be constituted by another organic material such as bark, flax, straw, corn starch, fruit stones or the like. It is also possible to partly or completely replace the organic particles with inorganic ones such as stone dust, sand, lime, mica or the like.

The thermoplastic material is suitably constituted by a polyolefin such as polyethylene, polypropylene, or polybutene but can also be constituted by others such as polystyrene, acrylnitril-butadiene-styrene copolymer, polyamid, polyvinyl chloride or polycarbonate.

Additives might be added to the material in order to adapt the elastic and acoustic properties of the core to the desired one. Among such additives can mentioned ethyl-vinyl-acetate, di-ethyl-phthalate, di-isobutyl-phthalate or epoxidated organic oils.

Among possible upper surfaces to the core specified above may be mentioned thermosetting laminates including at least a decorative paper impregnated with melamine-formaldehyde resin. Overlay paper and hard particles may be added to this as described earlier in the present application. The upper decorative surface may also be constituted by an acrylic foil, an acrylic lacquer and combinations thereof. It might also be constituted by a foil or a lacquer of acrylic, polyolefins or polyolefin derivatives.

The invention claimed is:

1. Surface covering unit comprising at least two surface elements with supporting base, decorative upper surface and edges for joining said at least two surface elements into said surface covering unit whereby, the surface covering unit comprises at least one static, and at least one mobile, digital memory member connected to an antenna for radio frequency transmitted communication with a base station, the at least one static digital memory member containing digital information obtained through means selected from the group consisting of encoding, pressure sensor and temperature sensor, and the at least one mobile digital memory member being encoded with digital information.

2. Surface covering unit according to claim 1, wherein the at least one mobile digital memory member is encoded with digital information in connection with the installation of the surface covering unit.

3. Surface covering unit according to claim 2, wherein the information embodied on the at least one static digital memory member comprises information selected from the group consisting of date of installation, surface element batch number, installer, environmental conditions during installation and accessories used for the installation.

4. Surface covering unit according to claim 1, wherein the at least one mobile digital memory member further comprises a processing unit.

5. Surface covering unit according to claim 4, wherein the at least one static digital memory member further comprises a temperature sensor.

6. Surface covering unit according to claim 4, wherein the at least one static digital memory member further comprises a pressure sensor.

7. Surface covering unit according to claim 6, wherein the pressure sensor is of a piezo electric type.

8. Surface covering unit according to claim 4, wherein the base station is installed at a distance up to 100 m from one or more of said at least one static digital memory members and that the base station communicates intermittently with the at least one static digital memory member.

9. Surface covering unit according to claim 8, wherein the base station comprises a central processing unit, which central processing unit is used for collecting and processing the data collected from the at least one static, and the at least one mobile, digital memory members.

10. Surface covering unit according to claim 9, wherein the central processing unit is used for collecting and presenting data selected from the group consisting of traffic for selected surface areas, temperature for selected surface areas and lapses in connection with selected of said at least one static digital memory member.

11. Surface covering unit according to claim 10, wherein the collected data is used for guiding items selected from the group consisting of goods display in stores, burglar alarm, refurnish planning, logistic planning, environmental control, message presentation and light emission.

12. Surface covering unit according to claim 1, wherein the mobile digital memory member is encoded with digital information, which information comprises information selected from the group consisting of date of installation, personal identification code, supervisor code, passage area limitations, passage date and time limitations.

13. Surface covering unit according to claim 12, wherein the mobile digital memory member unit is used for guiding items selected from the group consisting of burglar alarm, environmental control, message presentation, light emission and power supply to household utensils.

* * * * *